US 8,562,056 B2

(12) United States Patent
Furumi et al.

(10) Patent No.: US 8,562,056 B2
(45) Date of Patent: Oct. 22, 2013

(54) AUDIO APPARATUS FOR VEHICLE

(75) Inventors: Hiroshi Furumi, Wako (JP); Morihiro Inomata, Utsunomiya (JP); Yoshimi Inomata, legal representative, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 530 days.

(21) Appl. No.: 12/552,093

(22) Filed: Sep. 1, 2009

(65) Prior Publication Data

US 2010/0070985 A1 Mar. 18, 2010

(30) Foreign Application Priority Data

Sep. 5, 2008 (JP) .................................. 2008-227916

(51) Int. Cl.
*B60R 11/02* (2006.01)
*G11B 17/04* (2006.01)
*H04B 1/00* (2006.01)

(52) U.S. Cl.
USPC ....... 296/37.12; 381/86; 720/655; G9B/17.03

(58) Field of Classification Search
USPC .............. 296/37.12, 70, 72, 74, 193.02, 37.8, 296/37.1, 1.07, 24.34; 720/655; 381/86

IPC ........................................................ B60R 11/02
See application file for complete search history.

(56) References Cited

U.S. PATENT DOCUMENTS

| 6,709,041 | B1* | 3/2004 | Hotary et al. ................... 296/70 |
| 7,168,749 | B2* | 1/2007 | Schmidt et al. ............ 296/24.34 |
| 7,260,788 | B2* | 8/2007 | Arai ............................... 715/834 |
| 2005/0088586 | A1* | 4/2005 | Mori et al. ....................... 349/62 |
| 2006/0066120 | A1* | 3/2006 | Svenson et al. ............. 296/37.12 |
| 2006/0186686 | A1* | 8/2006 | Schmidt et al. ............. 296/37.12 |
| 2006/0214451 | A1* | 9/2006 | Haba et al. ................. 296/37.12 |
| 2007/0138822 | A1* | 6/2007 | Feit et al. ........................ 296/70 |

FOREIGN PATENT DOCUMENTS

| JP | 6-87387 A | 3/1994 |
| JP | 06-144084 A | 5/1994 |
| JP | 10-272993 A | 10/1998 |

* cited by examiner

*Primary Examiner* — Glenn Dayoan
*Assistant Examiner* — Sunsurraye Westbrook
(74) *Attorney, Agent, or Firm* — Arent Fox LLP

(57) ABSTRACT

An audio apparatus for a vehicle having an audio unit and storage box for storing goods integrally formed with each other and mounted in a mounting opening formed in an instrument panel. A lid for opening and closing the storage box is pivotally supported on the storage box audio unit side of the apparatus.

7 Claims, 8 Drawing Sheets

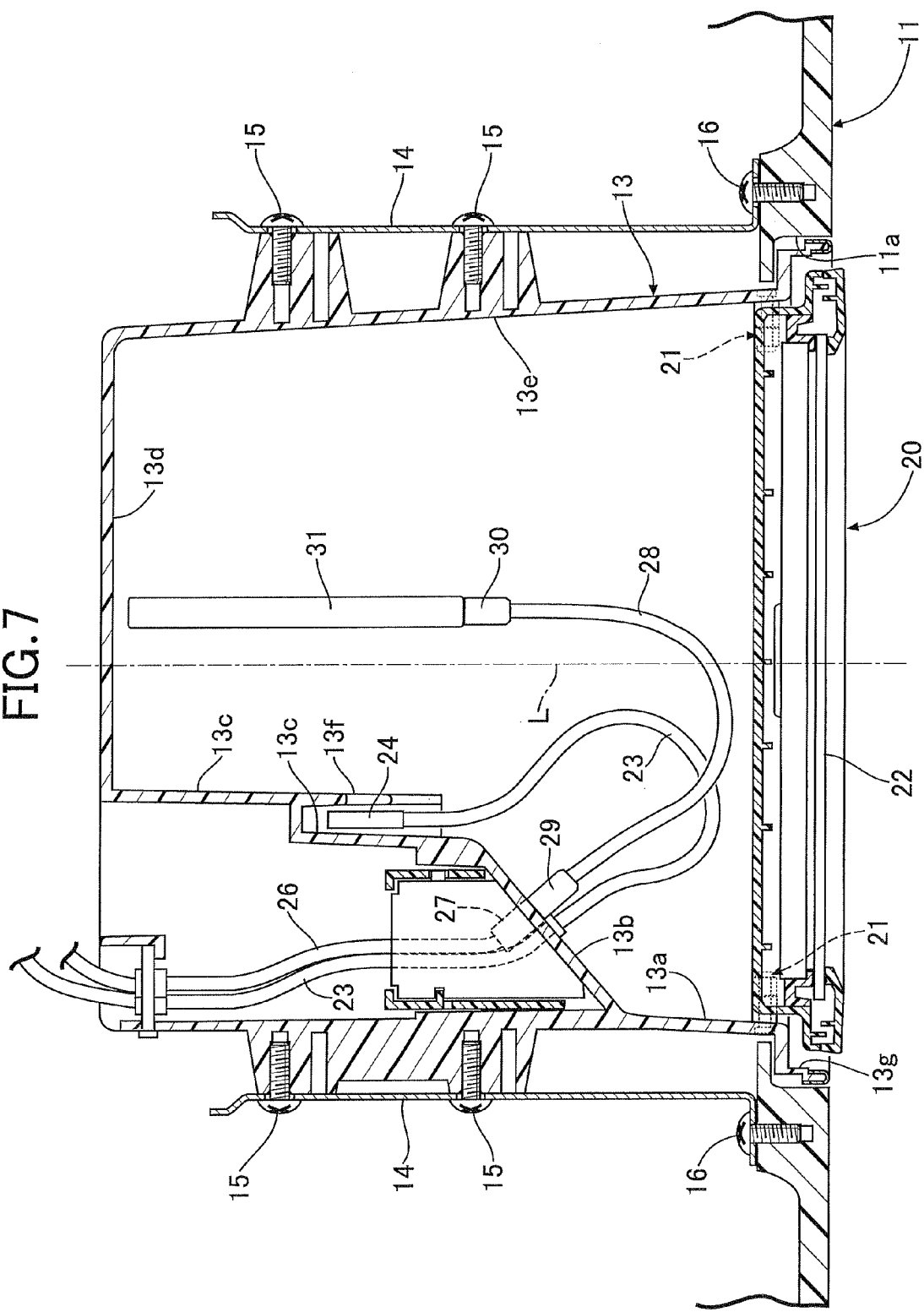

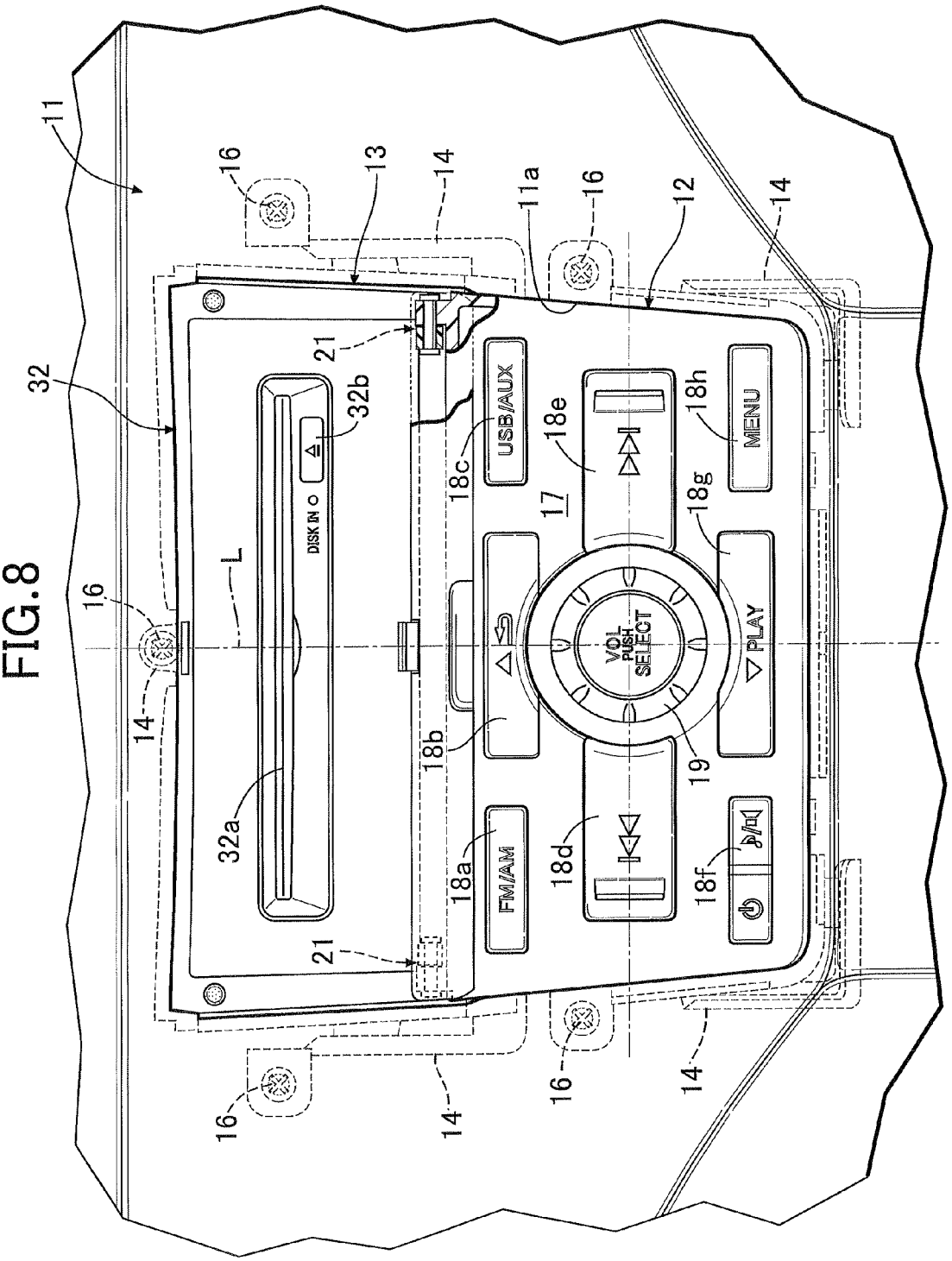

AUDIO APPARATUS FOR VEHICLE

BACKGROUND OF THE INVENTION

1. Field of the Invention

The present invention relates to an audio apparatus for vehicle having an audio unit and a storage box for storing goods provided adjacent to the audio unit, or the audio unit and a CD player provided above the audio unit, and which are mounted in a mounting opening formed in an instrument panel.

2. Description of the Related Art

Heretofore, a technique as disclosed in Japanese Patent Application Laid-open No. 6-87387 is known. In the technique, a 2 DIN size box is mounted in a mounting opening formed in a console of an instrument panel. The box has an opening that is openable and closable by a lid provided with a display or a switch and the like, and houses a radio main body in a space of 1 DIN size on the upper or lower side of the box.

However, there are inherent drawbacks for the known technique, such as, for example, in the case in which an audio unit is housed in one side of a space of 2 DIN size and a storage box is provided in the other side. If a lid for opening and closing the storage box is pivotally supported on the storage box or on a mounting opening of a vehicle body, size control of a gap at a connection between the audio unit and the lid becomes complicated and results in the gap having a nonuniform size, and detrimentally affects the appearance, and possibly creates a problem of requiring too much time and effort to make the gap uniform.

SUMMARY OF THE INVENTION

The present invention has been made in view of the above circumstances, and an aspect thereof is to facilitate size control of a gap between an audio unit and a lid of a storage box for storing goods when the audio unit and the storage box are placed adjacent to each other.

In order to achieve the above-described aspect, according to a first feature of the present invention, there is provided an audio apparatus for a vehicle that includes an audio unit, and a storage box for storing goods provided adjacent to the audio unit. The audio unit and storage box are mounted in a mounting opening formed in an instrument panel. A lid for opening and closing the storage box is pivotally supported on the audio unit.

In the structure according to the first feature, the audio unit and the storage box are mounted in the mounting opening formed in the instrument panel so as to be placed adjacent to each other, and the lid for opening and closing the storage box is pivotally supported, not on the instrument panel side or on the storage box side, but on the audio unit side. The aforementioned structural arrangement of the features facilitates making the position of the audio unit relative to the lid constantly uniform, and thus can improve the appearance of the audio apparatus while facilitating size control of a gap between the audio unit and the lid.

According to a second feature of the present invention, the storage box is formed integrally with the audio unit.

In the structure according to the second feature, the storage box is formed integrally with the audio unit. The aforementioned structural arrangement of the features facilitates making the position of the lid relative to the storage box constant, and thus eliminates the need for positional adjustment between the lid and the storage box, which improves work efficiency in assembling the audio apparatus.

According to a third feature of the present invention, there is provided an audio apparatus for a vehicle that includes an audio unit, and a CD player provided above the audio unit. The audio unit and the CD player are mounted in a mounting opening formed in an instrument panel. A lower edge of a lid for opening and closing a front side of the CD player is pivotally supported on the audio unit.

In the structure according to the third feature, the audio unit and the CD player are mounted in the mounting opening formed in the instrument panel, and the lower edge of the lid is pivotally supported on the audio unit. The aforementioned structural arrangement of the features facilitates making the position of the audio unit and the lid uniformly constant, and thus improves the appearance of the audio apparatus while facilitating size control of a gap between the audio unit and the lid. In addition, the structure makes the CD player highly accessible from above while the lid is open, and thus facilitates CD insertion and ejection into and from the CD player.

According to a fourth feature of the present invention, the lid is provided with at least one of a liquid crystal panel and a switch of the audio unit.

In the structure according to the fourth feature, the lid pivotally supported on the audio unit is provided with at least one of the liquid crystal panel and the switch of the audio unit. This structure eliminates the need for a cable connecting the liquid crystal panel or the switch to the audio unit, and thus simplifies interconnection therebetween.

The above description, other aspects, characteristics and advantages of the present invention will be clear from detailed descriptions which will be provided for the preferred embodiments referring to the attached drawings.

BRIEF DESCRIPTION OF THE DRAWINGS

FIG. 7 is a cross-sectional view taken along the line 3-3 in FIG. 1 and showing a usage state of second external storage means; and FIG. 8 is a front view of an audio unit for a vehicle according to a second embodiment of the present invention.

DETAILED DESCRIPTION OF THE PREFERRED EMBODIMENTS

Figure 1:
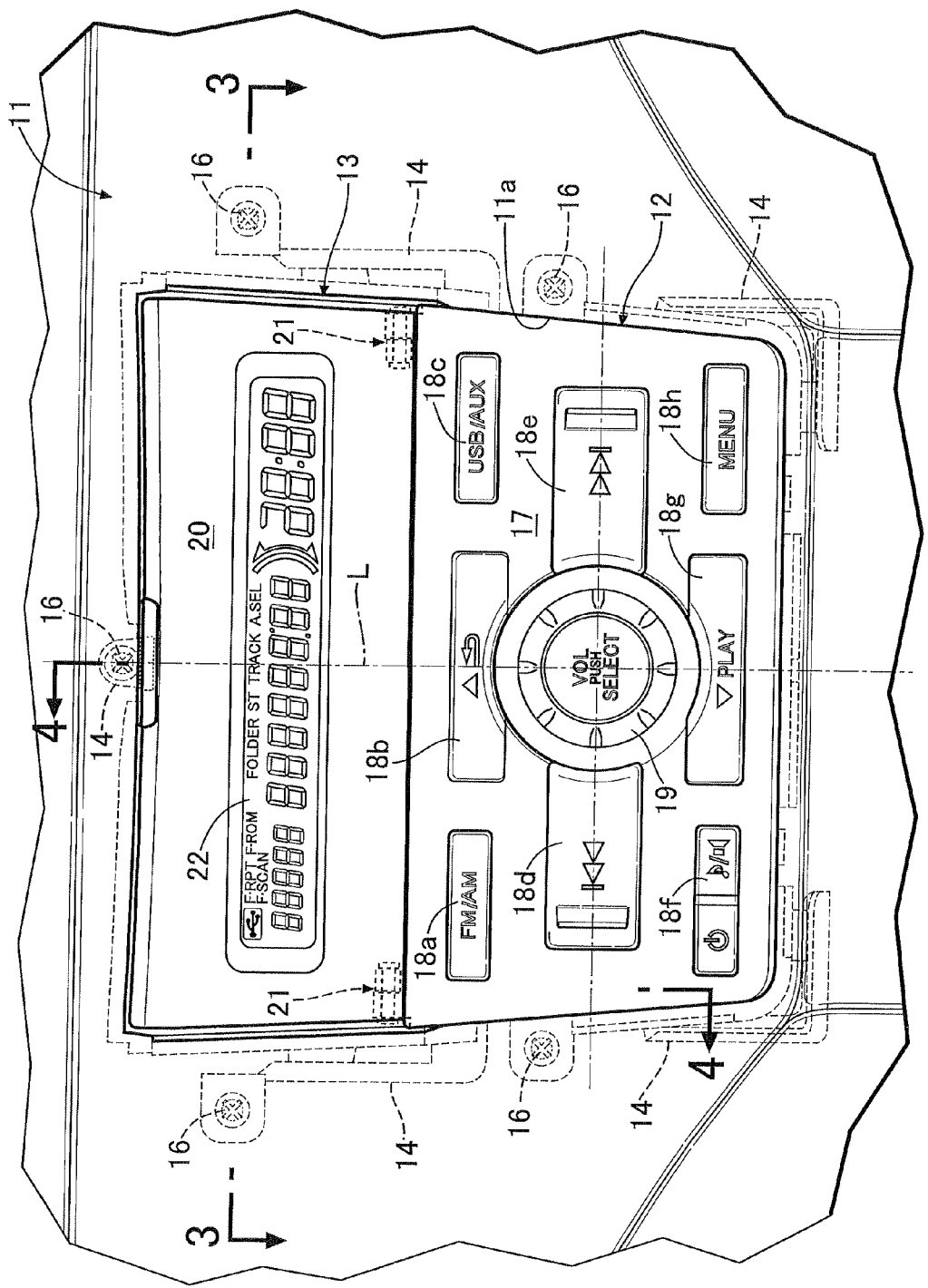
FIG. 1 is a front view of an audio unit for a vehicle according to a first embodiment of the present invention.
Figure 2:
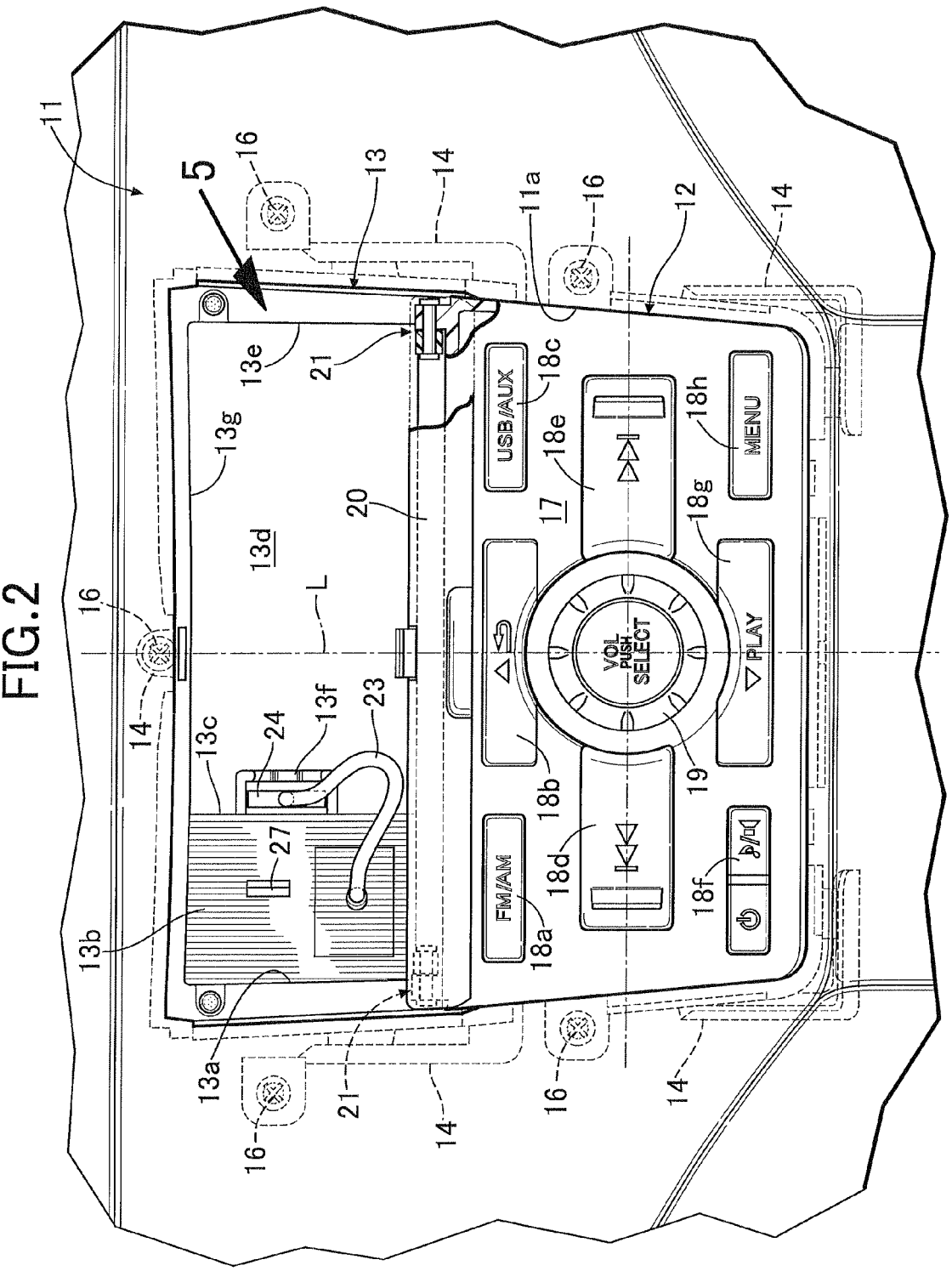
FIG. 2 is a front view showing a state in which a lid of the unit shown in FIG. 1 is opened.

A first embodiment of the present invention will be described below with reference to FIGS. 1 to 7.

As shown in FIGS. 1 to 5, an integrated combination of an audio unit 12 and a storage box 13, which is positioned above the audio unit 12, is mounted in a mounting opening 11a formed in an instrument panel 11 between a driver's seat and a passenger's seat in an automobile. Specifically, multiple mounting brackets 14 and corresponding bolts 15 (FIG. 3) are fixed to side surfaces of the audio unit 12 and the storage box 13. The mounting brackets 14 are then fixed to inner surfaces of the instrument panel 11 with the bolts 16.

A control panel 17 of the audio unit 12 is exposed at the surface of the instrument panel 11 and is provided with multiple buttons 18a to 18h and a dial 19, which are used for operating a radio, as well as for playing music stored in external storage means, such as an iPod (registered trademark), or a USB memory, which will be described later.

A lid 20 for opening and closing a box opening 13g of the storage box 13 is pivotally supported along the upper edge of the audio unit 12 by hinges 21 and 21 provided, respectively, at the left and right ends of the lower edge of the lid 20. In other words, the lid 20 is not supported on the side of the instrument panel 11, but rather is pivotally supported on the side of the integrated audio unit 12 and storage box 13 combination. Therefore, a gap between the upper edge of the audio unit 12 and the lower edge of the lid 20, and a gap between the box opening 13g of the storage box 13 and the outer periphery of the lid 20 are controlled, thereby improving the appearance of the audio apparatus.

If the lid 20 were provided on the side of the instrument panel 11, the gap between the upper edge of the audio unit 12 and the lower edge of the lid 20, as well as the gap between the box opening 13g of the storage box 13 and the outer periphery of the lid 20 would likely have to be nonuniform in size, which would lead to a problem of complicating adjustment of the gaps. By contrast, this embodiment facilitates control of the gaps while eliminating the above-described complicated adjustment problem, and improves the appearance of the audio apparatus.

In addition, since the lid 20, which is provided with a liquid crystal panel 22 for displaying various information regarding the audio unit 12, is pivotally supported on the upper edge of the audio unit 12, the liquid crystal panel 22 of the lid 20 is connected to the audio unit 12, not through leads, but through the inside of the hinges 21 and 21. This feature also improves the appearance of the audio apparatus, as well as the reliability of interconnection.

The storage box 13 includes first to fifth sidewalls 13a to 13e. The first sidewall 13a extends toward the front of the vehicle body from the left edge of the box opening 13g of the storage box 13. The second sidewall 13b extends obliquely rightward toward the front from the front end of the first sidewall 13a. The third sidewall 13c, which is stepped, extends toward the front of the vehicle body from the front end of the second sidewall 13b. The fourth sidewall 13d extends rightward parallel to the box opening 13g from the front end of the third sidewall 13c. The fifth sidewall 13e extends toward the front of the vehicle body from the right end of the box opening 13g of the storage box 13, and is continuously provided to the right end of the fourth sidewall 13d.

The first to third sidewalls 13a to 13c and the fifth sidewall 13e are inclined so as to, toward the front, gradually approach a center line L extending in the front and rear direction of the storage box 13. That is, a width W between the fifth sidewall 13e and the first to third sidewalls 13a to 13c gradually becomes smaller toward the front. In particular, the second sidewall 13b disposed between the first and third sidewalls 13a and 13c is significantly inclined, at an angle of 45° relative to the center line L of the storage box 13, so as to approach or taper toward the center line L.

Figure 3:
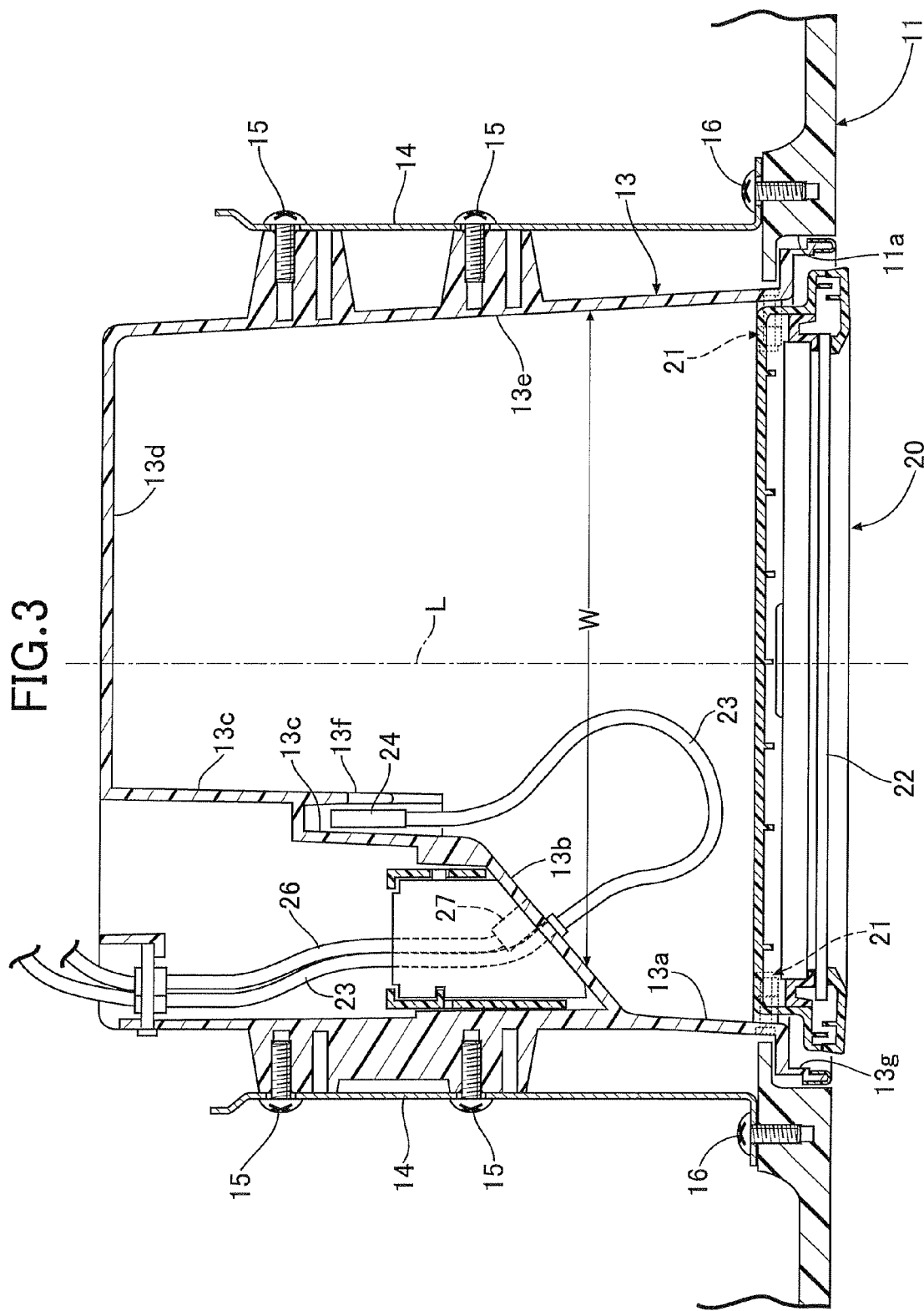
FIG. 3 is a cross-sectional view taken along a line 3-3 in FIG. 1.
Figure 4:
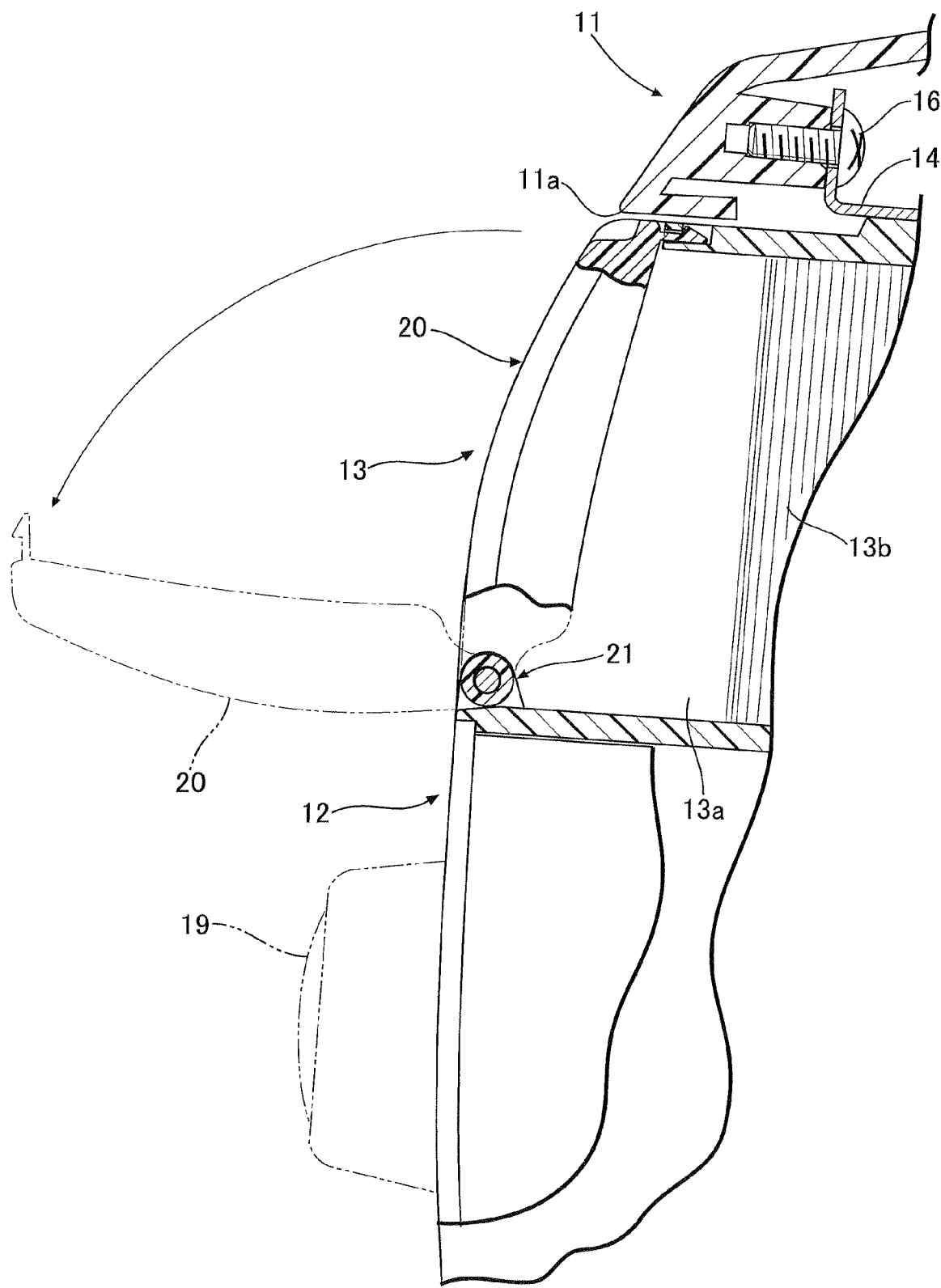
FIG. 4 is a cross-sectional view taken along a line 4-4 in FIG. 1.
Figure 6:
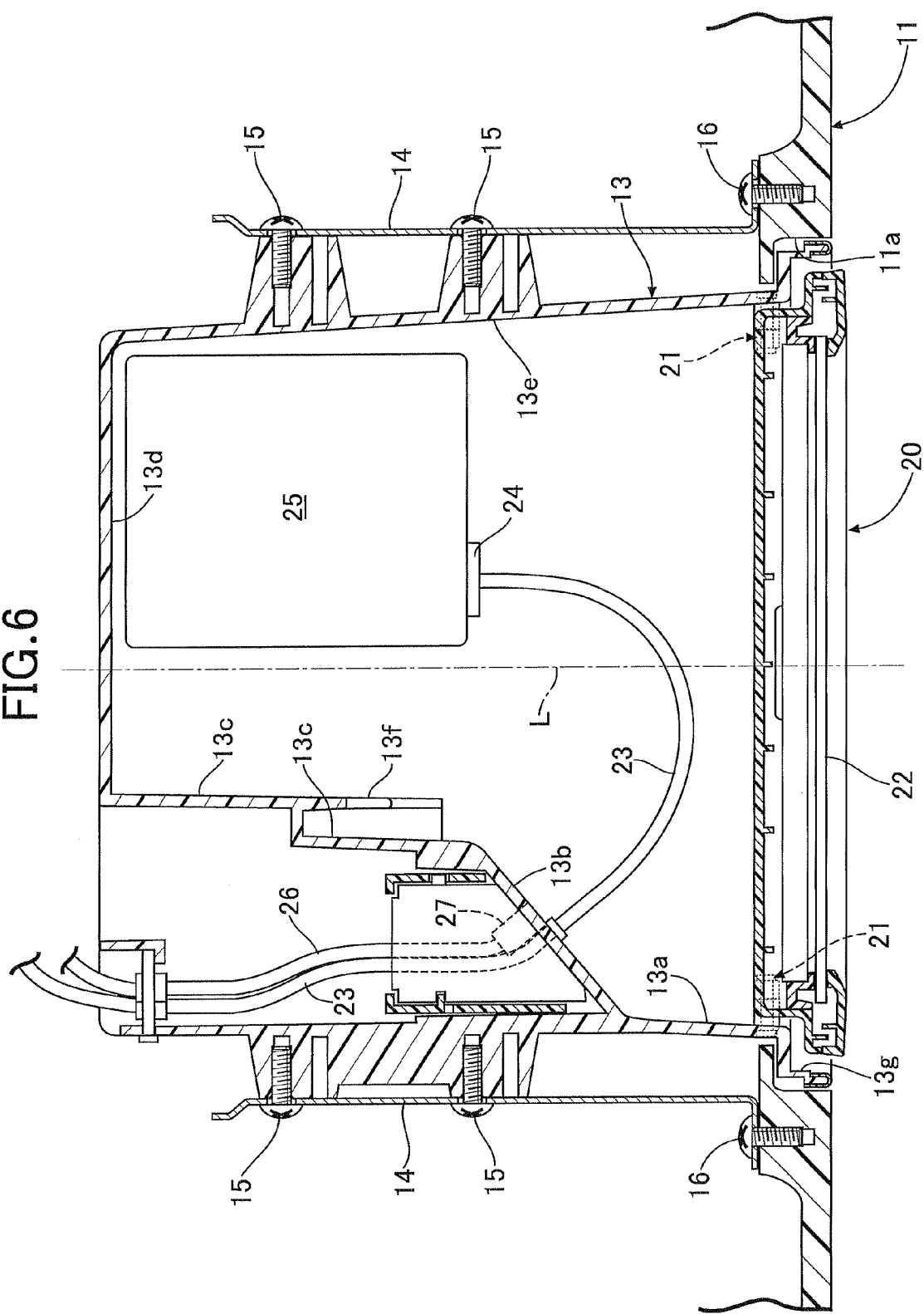
FIG. 6 is a cross-sectional view taken along the line 3-3 of FIG. 1 and showing a usage state of first external storage means.

As shown in FIGS. 3 and 6, a cable 23 having one end connected to the audio unit 12 extends through a lower portion of the second sidewall 13b and enters an interior space of the storage box 13. By connecting a connector 24 provided on a tip end of the cable 23 with a portable first external storage means 25, such as an iPod (registered trademark), the first external storage means 25 can be connected to the audio unit 12 (see FIG. 6). The connector 24 is held by a holder 13f provided in a stepped portion of the third sidewall 13c so as not to obstructively be suspended when not being used (see FIG. 3).

In addition, as shown in FIG. 7, an upper portion of the second sidewall 13b is provided with a connector 27 connected to the audio unit 12 via a cable 26. By connecting a connector 29 provided on one end of an auxiliary cable 28 with the connector 27 of the second sidewall 13b, as well as connecting a connector 30 provided on the other end of the auxiliary cable 28 with portable second external storage means 31, such as a USB memory, the second external storage means 31 can be connected to the audio unit 12.

Thus, if a driver or a passenger connects, to the audio unit 12 mounted in a vehicle, the first external storage means 25 or the second external storage means 31 storing sound such as music therein, he/she can enjoy the music by using the audio unit 12 and a loud speaker mounted in the vehicle. Moreover, the first and second external storage means 25 and 31 are stored in the storage box 13 and cannot be directly seen by a driver and a passenger, and thus do not deteriorate the appearance of the vehicle interior.

As described above, the second sidewall 13b on the left side of the storage box 13 is inclined at an angle of 45° relative to the center line L of the storage box 13, so as to approach the fifth sidewall 13e. As such, the cable 23 is able to be gently bent when connected to the first external storage means 25, as shown in FIG. 6, and thus reduces stress on the cable 23.

If the second sidewall 13b were formed to extend in a direction perpendicular to the center line L of the storage box 13 (i.e., in a direction parallel to the box opening 13g), the cable 23 would be more significantly bent, which would result in a greater stress being applied to the cable 23. This embodiment prevents such a problem.

In addition, as shown in FIG. 7, when the second external storage means 31 is connected to the audio unit 12 with the auxiliary cable 28, the connector 29 provided at one end of the auxiliary cable 28 needs to be connected to the connector 27 provided in the second sidewall 13b. The second sidewall 13b being inclined, facilitates the connecting work required for connecting the connectors 27 and 29.

Also, if the second sidewall 13b were formed to extend perpendicular to the center line L of the storage box 13, the first sidewall 13a would pose an obstacle to the act of connecting the connectors 27 and 29 to each other. This inconvenience is obviated by extending the second sidewall 13b further toward the center line L. However, this method has a problem of reducing the cubic capacity of the storage box 13, and thus reduces the goods storage capacity thereof. This embodiment prevents such a problem.

In particular, this embodiment ensures a longer distance between the front end of the second sidewall 13b and the center line L, as compared to the case of forming the second sidewall 13b so as to extend in the direction perpendicular to the center line L. Accordingly, by having the third sidewall 13c continuously extending toward the front end of the second sidewall 13b, the cubic capacity of a front portion of the storage box 13 is effectively increased.

Next, a second embodiment will be explained with reference to FIG. 8.

In the second embodiment, a CD player 32 is mounted instead of the storage box 13. The front side of the CD player 32 is provided with a CD loading slot 32a and a CD eject switch 32b, and is covered with the lid 20, whose lower edge is pivotally supported so as to be openable toward the vehicle interior.

As in the first embodiment, the lid 20 is pivotally supported, not on the instrument panel 11 side, but on the audio unit 12 side. Pivotally supporting the lid 20 as such eliminates the need for controlling the gap between the audio unit 12 and the lid 20, and thus allows for an improved appearance of the audio apparatus without performing complicated gap adjustment work while assembling the audio apparatus. In addition, the lid 20 is pivotally supported at the lower edge so as to be openable toward the vehicle interior. This makes the CD player 32 highly accessible from above while the lid 20 is open, and thus facilitates CD insertion and CD ejection into and from the CD player 32.

Although preferred embodiments of the present invention are explained above, the present invention is not limited thereto and may be modified in a variety of ways without departing from the spirit of the present invention.

For example, though the storage box 13 and the audio unit 12 are integrally formed in the foregoing embodiments, the storage box 13 and the audio unit 12 may be formed as separate members. If such is the case, the lid 20 is pivotally supported on the audio unit 12.

Moreover, though the storage box 13 and the instrument panel 11 are formed as separate members in the foregoing embodiment, the storage box 13 and the instrument panel 11 may be integrally formed.

Furthermore, though the liquid crystal panel 22 is provided to the lid 20 in the foregoing embodiment, various switches may be provided to the lid 20.

Figure 5:
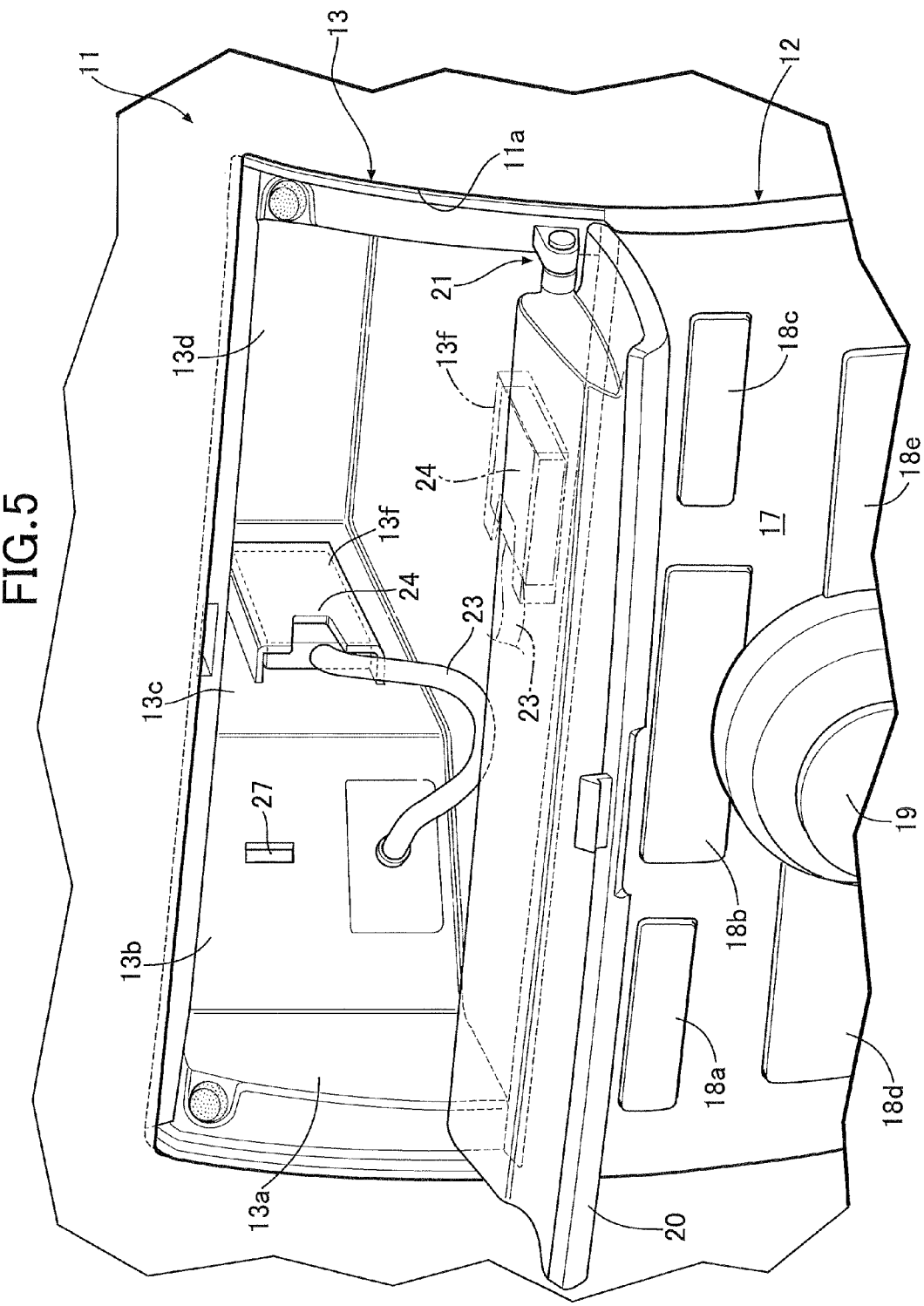
FIG. 5 is a view seen from a direction of an arrow 5 in FIG. 2.

Moreover, as indicated by the imaginary line in FIG. 5, the holder 13f may be provided on the back surface of the lid 20.

What is claimed is:

1. An audio apparatus for a vehicle, comprising:
   an audio unit, and
   a storage box for storing goods, the audio unit and the storage box being mounted in a mounting opening formed in an instrument panel of the vehicle,
   wherein the audio unit is formed into a box shape having a control panel at a front side facing an interior compartment of the vehicle thereof, said control panel being provided with an audio operating part, said audio unit being integrally formed at an upper wall thereof with said storage box which has a box opening at a front side,
   wherein the mounting opening of the instrument panel has a lower half portion and an upper half portion, the lower half portion being closed by the control panel and the box opening of the storage box being positioned at the upper half portion of the mounting opening, and
   wherein a lid for opening and closing the box opening of the storage box is pivotally supported at a lower edge thereof by hinges on the upper wall of the audio unit such that the upper half portion of the mounting opening is capable of being opened and closed by the lid.

2. The audio apparatus according to claim 1, wherein the lid is provided with at least one of a liquid crystal panel and a switch of the audio unit.

3. The audio apparatus according to claim 1, wherein the lid is provided with at least one of a liquid crystal panel connected to the audio unit though an interior space defined in the hinges, and a switch of the audio unit.

4. The audio apparatus according to claim 1, wherein the storage box comprises a first sidewall extending in a first direction toward a front of the vehicle, a second sidewall, and a third sidewall, the second sidewall connecting the first and third sidewalls.

5. The audio apparatus according to claim 4, wherein the second sidewall extends obliquely relative to the first direction, and the third sidewall includes a stepped portion defined therein.

6. The audio apparatus according to claim 5, wherein the second sidewall extends at an angle of 45 degrees relative to a center line of the storage box, and the stepped portion includes a holder provided therein.

7. The audio apparatus according to claim 4, wherein the second sidewall includes a cable passage defined in a lower portion thereof and a connector provided at an upper portion thereof.

* * * * *